United States Patent
Okamoto

(10) Patent No.: US 11,532,838 B2
(45) Date of Patent: Dec. 20, 2022

(54) NONAQUEOUS ELECTROLYTE SOLUTION AND NONAQUEOUS ELECTROLYTE BATTERY

(71) Applicant: KANTO DENKA KOGYO CO., LTD., Tokyo (JP)

(72) Inventor: Toshiaki Okamoto, Kurashiki (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 339 days.

(21) Appl. No.: 16/652,458

(22) PCT Filed: Oct. 30, 2018

(86) PCT No.: PCT/JP2018/040327
§ 371 (c)(1),
(2) Date: Mar. 31, 2020

(87) PCT Pub. No.: WO2019/088097
PCT Pub. Date: May 9, 2019

(65) Prior Publication Data
US 2020/0235432 A1    Jul. 23, 2020

(30) Foreign Application Priority Data

Oct. 31, 2017 (JP) .............................. JP2017-210134

(51) Int. Cl.
| | | |
|---|---|---|
| *H01M 10/0567* | (2010.01) | |
| *H01M 10/0525* | (2010.01) | |
| *H01M 10/0569* | (2010.01) | |

(52) U.S. Cl.
CPC ... *H01M 10/0567* (2013.01); *H01M 10/0525* (2013.01); *H01M 10/0569* (2013.01); *H01M 2300/0034* (2013.01); *H01M 2300/0037* (2013.01)

(58) Field of Classification Search
CPC ......... H01M 10/0525; H01M 10/0567; H01M 10/0569
See application file for complete search history.

(56) References Cited

U.S. PATENT DOCUMENTS

| | | |
|---|---|---|
| 2007/0172740 A1 | 7/2007 | Otsuki et al. |
| 2010/0081062 A1 | 4/2010 | Chiga et al. |
| 2014/0038059 A1 | 2/2014 | Li et al. |
| 2015/0221987 A1 | 8/2015 | Yawata et al. |
| 2017/0040649 A1 | 2/2017 | Schmitz et al. |
| 2017/0256819 A1 | 9/2017 | Kondo et al. |
| 2018/0090790 A1 | 3/2018 | Nakatsutsumi et al. |

FOREIGN PATENT DOCUMENTS

| | | | | |
|---|---|---|---|---|
| CN | 103208653 A | * | 7/2013 | ........ H01M 10/0567 |
| CN | 106165182 A | | 11/2016 | |
| CN | 107408737 A | | 11/2017 | |
| EP | 3132488 A1 | | 2/2017 | |
| JP | 2008-041308 A | | 2/2008 | |
| JP | 2008-041413 A | | 2/2008 | |
| JP | 2008-135273 A | | 6/2008 | |
| JP | 2017-511588 A | | 4/2017 | |
| JP | 2017-208246 A | | 11/2017 | |
| KR | 2016-0145723 A | | 12/2016 | |
| WO | 2009/028567 A1 | | 12/2010 | |
| WO | 2015/158755 A1 | | 10/2015 | |
| WO | 2017/047020 A1 | | 7/2018 | |
| WO | 2019/088097 A1 | | 5/2019 | |

OTHER PUBLICATIONS

International Search Report, dated Dec. 11, 2018, from corresponding PCT application No. PCT/JP2018/040327.

* cited by examiner

*Primary Examiner* — Karie O'Neill Apicella
(74) *Attorney, Agent, or Firm* — Nixon & Vanderhye

(57) ABSTRACT

Disclosed is a nonaqueous electrolyte solution containing a lithium electrolyte, methyl 3,3,3-trifluoropropionate, and a phosphazene compound. Preferably, the phosphazene compound is a cyclic phosphazene compound represented by the disclosed general formula (I).

20 Claims, No Drawings

NONAQUEOUS ELECTROLYTE SOLUTION AND NONAQUEOUS ELECTROLYTE BATTERY

TECHNICAL FIELD

The present invention relates to a nonaqueous electrolyte solution and a nonaqueous electrolyte battery.

BACKGROUND ART

Nonaqueous electrolyte solutions for use in lithium ion secondary batteries include flammable organic solvents, and thus, there are problems, such as firing due to liquid leak from a battery, an internal short circuit, or the like. The battery capacity of lithium ion secondary batteries has been increasing, and technologies for ensuring the safety thereof have become more important under such circumstance.

It is known that a phosphazene compound, such as a fluorinated phosphazene, is effective as a flame retardant that can be used in a nonaqueous electrolyte solution of a lithium ion secondary battery (e.g., Patent Literature 1). In the case of an electrolyte solution that includes a highly flammable chain carbonate, a phosphazene compound needs to be added thereto at a high concentration so as to impart a sufficient flame-retardant effect. However, the phosphazene compound itself cannot dissolve a lithium salt. Thus, an increase in the amount of phosphazene compound added disadvantageously causes a reduction in the conductivity of the electrolyte solution, which lowers the battery performance. Therefore, even when a phosphazene compound is added, it is not possible to provide complete non-flammability while maintaining the battery performance.

Efforts have also been made to find a combination of a solvent and a phosphazene compound for use in a nonaqueous electrolyte solution so as to provide an effect. For example, a method in which a low-combustibility fluorinated solvent is used in combination with a phosphazene compound has been proposed (Patent Literatures 2 and 3).

Moreover, Patent Literature 4 discloses a lithium ion battery including an electrolyte solution in which various fluorinated esters are used.

CITATION LIST

Patent Literatures

Patent Literature 1: US2007172740 A1
Patent Literature 2: US2015221987 A1
Patent Literature 3: US2014038059 A1
Patent Literature 4: US2010081062 A1

SUMMARY OF INVENTION

However, the fluorinated solvents used in Patent Literatures 2 and 3 have high viscosity because those solvents contain fluorine, and the high viscosity causes a deterioration in battery characteristics. Also, even when those solvents are combined with a phosphazene compound, the flame retardancy is still insufficient.

The electrolyte solution disclosed in Patent Literature 4 is not so different from an electrolyte solution including a commonly used fluorine-free solvent with a low viscosity in terms of the flash point and the combustibility, and the flame retardancy is still to be improved.

Fluorinated solvents differ from one another in their properties, such as viscosity, non-flammability, and flame retardancy. The inventor of the present invention has found that, when a phosphazene compound for improving safety is added to a lithium salt-containing electrolyte solution including methyl 3,3,3-trifluoropropionate, the fire point is significantly improved even if the amount of the phosphazene compound added is extremely small, and that at that time, the output characteristics of a nonaqueous electrolyte battery can also be maintained at a high level. In other words, it has been found that, a high flame-retardant effect can be provided due to synergy of a specific fluorinated chain ester compound and a fluorinated phosphazene even with an extremely small amount of the phosphazene, and that this effect is compatible with the battery characteristics.

The present invention has been made based on the above-described findings, and provides a nonaqueous electrolyte solution containing a lithium electrolyte, a fluorinated chain ester compound, and a phosphazene compound, wherein methyl 3,3,3-trifluoropropionate is contained as the fluorinated chain ester compound.

The present invention also provides a nonaqueous electrolyte battery including a positive electrode, a negative electrode, and the above-described nonaqueous electrolyte solution.

DESCRIPTION OF EMBODIMENTS

Hereinafter, preferred embodiments of the present invention will be described.

Solvent

A solvent for an electrolyte solution that is used in a lithium ion battery is required to have various properties such as a wide potential window, low viscosity, and the solubility of a lithium salt. The inventor of the present invention has found that methyl 3,3,3-trifluoropropionate (hereinafter referred to also as FMP) has an extremely suitable balance between the flame retardancy and the viscosity for a nonaqueous electrolyte solution to be used in a lithium ion battery and hence has high flame retardancy even when the amount of a phosphazene compound added thereto is small, and that when FMP with a small amount of a phosphazene compound is used in a nonaqueous electrolyte battery, the battery has excellent output characteristics.

In contrast, various fluorinated chain ester compounds that have conventionally been studied as low viscosity solvents need a high fluorine content in order to be flame-retardant. With this fluorination, the viscosity also increases, and therefore, it is difficult for the conventional fluorinated chain ester compounds to achieve both the non-flammability and the favorable charge/discharge characteristics. Moreover, for example, in the case where only a fluorinated ether compound is used, the solubility of a lithium salt in the compound is low if the compound includes fluorine sufficient for non-flammability, and therefore, this approach is impractical.

FMP is a compound represented by the chemical formula below.

[Chemical Formula 1]

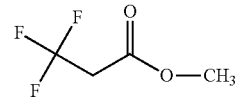

The volume percentage of FMP is preferably 30 vol % or greater with respect to the total solvent volume in the nonaqueous electrolyte solution, in view of the flame-retardant effect provided by FMP and the battery characteristics. From this point of view, the volume percentage of FMP is more preferably 40 vol % or greater, and even more preferably 50 vol % or greater with respect to the total solvent volume in the nonaqueous electrolyte solution. The volume percentage of FMP may be 100 vol % with respect to the total solvent volume in the nonaqueous electrolyte solution; however, in order to additionally use another solvent component to obtain further improving effects on battery characteristics and the flame retardancy, the volume percentage of FMP is preferably 95 vol % or less.

The volume percentage herein refers to the volume percentage at 25° C.

As described above, the nonaqueous electrolyte solution of the present invention can contain another solvent component in addition to FMP. Examples of the other solvent component include an ester compound, an ether compound, a sulfone compounds, a phosphoric acid derivative and a phosphonic acid derivative, and a nitrile compound, and these may be either a non-fluorinated solvent or a fluorinated solvent.

The ester compound herein refers to a compound that contains a —CO—O— group, and examples thereof include compounds represented by any of the general formulae (1) to (3) below.

[Chemical Formula 2]

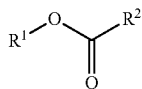

(1)

where $R^1$ represents a fluorinated or non-fluorinated alkyl group; $R^2$ represents a fluorinated or non-fluorinated alkyl group or a fluorinated or non-fluorinated alkoxy group; and provided that methyl 3,3,3-trifluoropropionate is excluded.

A fluorinated compound of the formula (1) herein refers to a compound in which at least one of $R^1$ and $R^2$ is a fluorinated group.

[Chemical Formula 3]

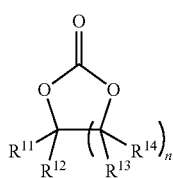

(2)

where $R^{11}$, $R^{12}$, $R^{13}$, and $R^{14}$ each independently represent a hydrogen atom, a fluorine atom, or a fluorinated or non-fluorinated alkyl group; n is 1 or 2; and a plurality of $R^{13}$ may be the same or different, if any, and a plurality of $R^{14}$ may be the same or different, if any.

A fluorinated compound of the formula (2) herein refers to a compound in which at least one of $R^{11}$, $R^{12}$, $R^{13}$, and $R^{14}$ is a fluorine atom or a fluorinated group.

[Chemical Formula 4]

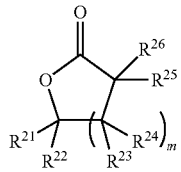

(3)

where $R^{21}$, $R^{22}$, $R^{23}$, $R^{24}$, $R^{25}$, and $R^{26}$ each independently represent a hydrogen atom, a fluorine atom, or a fluorinated or non-fluorinated alkyl group; m is 1 or 2; and a plurality of $R^{23}$ may be the same or different, if any, and a plurality of $R^{24}$ may be the same or different, if any.

A fluorinated compound of the formula (3) herein refers to a compound in which at least one of $R^{21}$, $R^{22}$, $R^{23}$, $R^{24}$, $R^{25}$, and $R^{26}$ is a fluorine atom or a fluorinated group.

Examples of the non-fluorinated alkyl group represented by $R^1$, $R^2$, $R^{11}$, $R^{12}$, $R^{13}$, $R^{14}$, $R^{21}$, $R^{22}$, $R^{23}$, $R^{24}$, $R^{25}$, and $R^{26}$ include alkyl groups having 1 to 10 carbon atoms, and specifically include linear alkyl groups such as a methyl group, an ethyl group, a propyl group, an n-butyl group, an n-pentyl group, an n-heptyl group, an n-octyl group, an n-nonyl group, and an n-decyl group; branched alkyl groups such as an isopropyl group, an isobutyl group, a sec-butyl group, a tert-butyl group, an isopentyl group, a 2,2-dimethylpropyl group, a 1-ethylbutyl group, a 1,1,3,3-tetramethylbutyl group, and a 2-ethylhexyl group; and cycloalkyl groups such as a cyclopropyl group, a cyclopropylmethyl group, a cyclobutyl group, a cyclopentyl group, and a cyclohexyl group.

Among these, alkyl groups having 1 to 4 carbon atoms are preferable, alkyl groups having 1 to 3 carbon atoms are more preferable, and alkyl group having 1 to 2 carbon atoms are even more preferable. In particular, linear alkyl groups are preferable. Examples of especially preferable linear alkyl groups include a methyl group, an ethyl group, an n-propyl group, and an n-butyl group, and a methyl group and an ethyl group are most preferable.

Examples of the fluorinated alkyl group represented by $R^1$, $R^2$, $R^{11}$, $R^{12}$, $R^{13}$, $R^{14}$, $R^{21}$, $R^{22}$, $R^{23}$, $R^{24}$, $R^{25}$, and $R^{26}$ include those derived from non-fluorinated alkyl groups represented by $R^1$ and the like above in which at least one hydrogen atom is replaced with a fluorine atom, and specific examples thereof include a fluoromethyl group, a difluoromethyl group, a trifluoromethyl group, a fluoroethyl group, a difluoroethyl group, a trifluoroethyl group, a pentafluoroethyl group, a heptafluoropropyl group, and a nonafluorobutyl group. Among these fluorinated alkyl groups, groups having 1 to 4 carbon atoms are preferable, groups having 1 to 3 carbon atoms are more preferable, and groups having 1 to 2 carbon atoms are especially preferable.

Examples of the non-fluorinated or fluorinated alkoxy group represented by $R^2$ include those derived from a non-fluorinated or fluorinated alkyl group represented by $R^1$, $R^2$, and the like above in which an oxygen atom is bound to the free bond thereof. Among these non-fluorinated or fluorinated alkoxy groups, groups having 1 to 12 carbon atoms are preferable, and groups having 1 to 2 carbon atoms are especially preferable. The substituent may include two or more ether bonds.

A hydrogen atom in the formulae (1) to (3), that is, a hydrogen atom represented by $R^{11}$, $R^{12}$, $R^{13}$, $R^{14}$, $R^{21}$, $R^{22}$, $R^{23}$, $R^{24}$, $R^{25}$, and $R^{26}$ or a hydrogen atom in the above-described groups represented by $R^1$, $R^2$, $R^{11}$, $R^{12}$, $R^{13}$, $R^{14}$, $R^{21}$, $R^{22}$, $R^{23}$, $R^{24}$, $R^{25}$, and $R^{26}$ may be replaced with a substituent. Examples of the substituent include a halogen atom, an amino group, an aryl group having 6 to 20 carbon atoms, and an arylalkyl group having 7 to 20 carbon atoms, and a hydrogen atom in these substituents may be replaced with a fluorine atom.

When the compounds represented by the formulae (1) to (3) are fluorinated compounds, the number of fluorine atoms in these compounds is preferably from 1 to 10, and more preferably from 2 to 6. In particular, the number of fluorine atoms in the compound represented by the formula (1) is preferably from 1 to 10, and more preferably from 3 to 7. In particular, the number of fluorine atoms in the compound represented by the formula (2) or (3) is preferably from 1 to 6, and more preferably from 1 to 3.

The compound represented by the formula (1) is also referred to as a chain ester. In view of rendering the compound less viscous and improving the output characteristics of a nonaqueous electrolyte battery to be obtained, the compound represented by the formula (1) preferably has 3 to 6 carbon atoms, more preferably 3 to 5 carbon atoms, and especially preferably 3 to 4 carbon atoms. Specific examples thereof include the following compounds.

Examples of a non-fluorinated chain ester represented by the formula (1) include chain carbonates such as dimethyl carbonate, diethyl carbonate, dipropyl carbonate, dibutyl carbonate, ethyl methyl carbonate, methylpropyl carbonate, and ethylpropyl carbonate; and chain carboxylic acid esters such as methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, and butyl butyrate.

Examples of a fluorinated chain ester represented by the formula (1) include fluorinated chain carbonates such as bis(fluoromethyl) carbonate, bis(2-fluoroethyl) carbonate, 1-fluoroethyl fluoromethyl carbonate, 2-fluoroethyl fluoromethyl carbonate, methyl fluoromethyl carbonate, ethyl (1-fluoroethyl) carbonate, ethyl(2-fluoroethyl) carbonate, ethyl fluoromethyl carbonate, methyl(1-fluoroethyl) carbonate, methyl(2-fluoroethyl) carbonate, bis(2,2-difluoroethyl) carbonate, 2,2-difluoroethyl methyl carbonate, ethyl(2,2-difluoroethyl) carbonate, bis(2,2,2-trifluoroethyl) carbonate, 2,2,2-trifluoroethyl methyl carbonate, 2,2,2-trifluoroethyl propyl carbonate, and 2,2,3,3,3-pentafluoropropyl methyl carbonate; and fluorinated chain carboxylic acid esters such as 2,2,2-trifluoroethyl formate, 2,2-difluoroethyl acetate, 2,2,2-trifluoroethyl acetate (hereinafter also referred to as FEA), trifluoromethyl acetate, 2,2,3,3-tetrafluoropropyl acetate, methyl 2-fluoropropionate, ethyl 2-fluoropropionate, methyl 2,2-difluoropropionate, ethyl 2,2-difluoropropionate, ethyl 3,3,3-trifluoropropionate, 2,2,2-trifluoroethyl 2,2-difluoropropionate, 2,2,2-trifluoroethyl 3,3,3-trifluoropropionate, methyl 2,3,3,3-tetrafluoropropionate, ethyl 2,3,3,3-tetrafluoropropionate, methyl pentafluoropropionate, ethyl pentafluoropropionate, methyl heptafluorobutyrate, methyl difluoroacetate, ethyl difluoroacetate, 2,2,2-trifluoroethyl difluoroacetate, methyl trifluoroacetate, ethyl trifluoroacetate, propyl trifluoroacetate, trifluoromethyl trifluoroacetate, 2,2,2-trifluoroethyl trifluoroacetate, perfluoroethyl trifluoroacetate, and 2,2,3,3-tetrafluoropropyl trifluoroacetate.

The compound represented by the formula (2) or (3) is also called a cyclic ester.

The compound represented by the formula (2) preferably has 3 to 10 carbon atoms, and especially preferably 3 to 4 carbon atoms. Specific examples thereof include the following compounds.

Examples of a non-fluorinated cyclic ester represented by the formula (2) include cyclic carbonates such as ethylene carbonate (hereinafter also referred to as EC), propylene carbonate, and butylene carbonate.

Examples of a fluorinated cyclic ester represented by the formula (2) include fluoroethylene carbonate (hereinafter also referred to as FEC), difluoroethylene carbonate, fluoropropylene carbonate, and trifluoropropylene carbonate.

The compound represented by the formula (3) preferably has 3 to 10 carbon atoms, and especially preferably 4 to 6 carbon atoms. Specific examples thereof include the following compounds.

Examples of a non-fluorinated cyclic ester represented by the formula (3) include γ-butyrolactone, 2-methyl-γ-butyrolactone, 3-methyl-γ-butyrolactone, 4-methyl-γ-butyrolactone, β-propiolactone, and δ-valerolactone.

Examples of a fluorinated cyclic ester represented by the formula (3) include those derived from these lactones in which at least one hydrogen atom is replaced with a fluorine atom.

Specific examples of the ether compound mentioned hereinbefore include the following compounds.

For the case where the ether compound is a non-fluorinated solvent, examples thereof include tetrahydrofuran, 2-methyltetrahydrofuran, 1,3-dioxolane, 1,4-dioxane, 1,2-dimethoxyethane, 1,2-diethoxyethane, and 1,2-dibutoxyethane.

For the case where the ether compound is a fluorinated solvent, examples thereof include 1,1,2,2-tetrafluoroethyl 2,2,2-trifluoroethyl ether, 1,1,2,2-tetrafluoroethyl(2,2,3,3tetrafluoropropyl)ether, 2,2,3,3,3-pentafluoropropyl methyl ether, 2,2,3,3,3-pentafluoropropyl fluoromethyl ether, 2,2,3,3-pentafluoropropyl trifluoromethyl ether, 4,4,4,3,3,2,2-heptafluorobutyl difluoromethyl ether, 4,4,3,2,2-pentafluorobutyl(2,2,2-trifluoroethyl)ether, methyl nonafluorobutyl ether, ethyl nonafluorobutyl ether, difluoromethyl(1,1,1-trifluoroethyl)ether, 1,1,2,2-tetrafluoroethyl(3,3,3-trifluoroethyl)ether, and difluoromethyl(1,1,1,2-tetrafluoroethyl)ether, (2-trifluoromethyl-2,3,3,3-tetrafluoropropyl)methyl ether, 1-(2-fluoroethoxy)-2-methoxyethane, 1-(2,2-difluoroethoxy)-2-methoxyethane, 1-methoxy-2-(2,2,2-trifluoroethoxy)ethane, 1-ethoxy-2-(2-fluoroethoxy)ethane, 1-(2,2-difluoroethoxy)-2-ethoxyethane, and 1-ethoxy-2-(2,2,2-trifluoroethoxy)ethane.

A fluorinated chain ether represented by the formula (4) is preferable as the ether compound.

$$C_iH2_{i+1-b}F_b\text{—}O\text{—}C_jH_{2j+1-k}F_k \qquad (4)$$

where i is an integer of 1 to 8, j is an integer of 1 to 8, b is an integer of 0 to 2i+1, k is an integer of 0 to 2j+1, and at least one of b and k is an integer of 1 or more.

In the fluorinated chain ether represented by the formula (4), examples of the groups represented by $C_iH2_{i+1-b}F_b$ and $C_jH_{2j+1-k}F_k$ include groups derived from the linear or branched alkyl groups listed above as examples of $R^1$ and the like in which a hydrogen atom is replaced with a fluorine atom.

As the fluorinated chain ether represented by the formula (4), fluorinated chain ethers in which i is from 1 to 8 and j is from 1 to 8 are preferable, and fluorinated chain ethers in which i is from 1 to 4 and j is from 1 to 4 are more preferable, in view of viscosity.

In view of battery characteristics and flame retardancy, the fluorine content in the compound is preferably 60 mass % or greater. Also, it is preferable that i+j=4 to 7, and it is more preferable that i+j=4 to 6.

Specific examples of the phosphoric acid derivative or phosphonic acid derivative mentioned hereinbefore include the following compounds.

Examples of a non-fluorinated phosphoric acid derivative include trimethyl phosphate, triethyl phosphate, tris(2-chloroethyl) phosphate, tripropyl phosphate, triisopropyl phosphate, tributyl phosphate, trihexyl phosphate, triphenyl phosphate, tritolyl phosphate, methylethylene phosphate, and ethylethylene phosphate.

Examples of a fluorinated phosphoric acid derivative or a fluorinated phosphonic acid derivative include tris(2,2,2-trifluoroethyl) phosphate, tris(1,1,2,2-tetrafluoroethyl) phosphate, tris(hexafluoro-isopropyl) phosphate, (2,2,3,3-tetrafluoropropyl) dimethyl phosphate, bis(2,2,3,3-tetrafluoropropyl) methyl phosphate, and tris(2,2,3,3-tetrafluoropropyl) phosphate, tris(4-fluorophenyl) phosphate and pentafluorophenyl phosphate, trifluoromethyl dimethylphosphonate, trifluoromethyl di(trifluoromethyl)phosphonate, (2,2,3,3-tetrafluoropropyl) dimethylphosphonate, phenyl di(trifluoromethyl)phosphonate, and 4-fluorophenyl dimethylphosphonate.

Specific examples of the sulfone compound hereinbefore mentioned include non-fluorinated sulfones, such as dimethyl sulfone and ethyl methyl sulfone; partially fluorinated sulfones, such as methyl trifluoromethyl sulfone, ethyl trifluoromethyl sulfone, methyl pentafluoroethyl sulfone, and ethyl pentafluoroethyl sulfone; di(trifluoromethyl) sulfone, di(pentafluoroethyl) sulfone, trifluoromethyl pentafluoroethyl sulfone, trifluoromethyl nonafluorobutyl sulfone, and pentafluoroethyl nonafluorobutyl sulfone.

Examples of the nitrile hereinbefore mentioned include acetonitrile, propionitrile, butyronitrile, succinonitrile, and adipponitrile.

Any solvents that are not listed above may also be used, including ionic liquids, hydrocarbons, aromatic hydrocarbons, fluorinated hydrocarbons, and fluorinated aromatic hydrocarbons.

Among these other solvents, the ester compound is preferably used in view of the ease in industrially providing both the improving effect on flame retardancy and the improving effect on output characteristics with the use of FMP.

In the present invention, the nonaqueous electrolyte solution preferably contains a fluorinated ester compound in addition to FMP in view of flame retardancy. Preferred fluorinated ester compounds are the above-listed fluorinated ester compounds represented by the formula (1), (2), or (3). In view of flame retardancy, a fluorinated ester compound represented by the formula (2) or (3) is more preferably contained, and a fluorinated ester compound represented by the formula (2) is especially preferably contained. It is more preferable that a compound that is listed above as a preferred example of the fluorinated ester compound represented by the formula (1), (2), or (3) be contained. Particularly preferred fluorinated ester compounds include 2,2,2-trifluoroethyl acetate, fluoroethylene carbonate, fluoropropylene carbonate, and trifluoropropylene carbonate, and, among these, 2,2,2-trifluoroethyl acetate and fluoroethylene carbonate are especially preferable.

When a fluorinated ester compound other than FMP is contained, the amount of the fluorinated ester compound is preferably from 5 vol % to 70 vol % with respect to the total solvent volume in the nonaqueous electrolyte solution. Within this range, while the improving effects on flame retardancy and on the output characteristics of the nonaqueous electrolyte battery are exhibited, which are provided by FMP contained, the effects of the fluorinated ester compound other than FMP are also likely to be exhibited.

Moreover, in the present invention, it is also preferable to use a non-fluorinated cyclic ester compound represented by the formula (2) or (3), because a certain level of flame retardancy can be obtained. Particularly preferred compounds include ethylene carbonate, propylene carbonate, and γ-butyrolactone.

When the nonaqueous electrolyte solution of the present invention contains a fluorinated ester compound represented by the formula (1) or a fluorinated or non-fluorinated ester compound represented by the formula (2) or (3), the amount of the ester compound is preferably from 5 vol % to 70 vol %, and more preferably from 5 vol % to 50 vol % with respect to the total solvent volume in the nonaqueous electrolyte solution. Within this range, while the improving effects on flame retardancy and on the output characteristics of the nonaqueous electrolyte battery are exhibited, which are provided by FMP contained, the effects of the ester compound other than FMP are also likely to be exhibited. In the case where the nonaqueous electrolyte solution contains both the fluorinated ester compound represented by (1) and the ester compound represented by the formula (2) or (3), the above-described percentage is of the total amount of these ester compounds.

In particular, the ester compound represented by the formula (2) or (3) is a high-permittivity solvent, and increases the degree of dissociation of the electrolyte to improve the ion conductivity. Therefore, the ester compound represented by the formula (2) or (3) is preferably contained in the nonaqueous electrolyte solution. When the ester compound represented by the formula (2) or (3) is contained in the electrolyte solution, the flash point and the fire point of the electrolyte solution are advantageously higher because the ester compound represented by the formula (2) or (3) has a high flash point. In view of providing both the flame retardancy and the battery characteristics, the amount added of the ester compound represented by the formula (2) or (3) is preferably from 5 vol % to 100 vol %, and more preferably from 10 vol % to 50 vol % with respect to the total volume of FMP and the fluorinated ester compound represented by the formula (1).

As used herein, the total volume of FMP and the fluorinated ester compound represented by the formula (1) refers to the amount of FMP, if the fluorinated ester compound represented by the formula (1) is not contained.

The fluorinated ester compound represented by the formula (1) is preferably contained, because it provides a reduced viscosity of the nonaqueous electrolyte solution and also an enhanced improving effect on the flame retardancy. In the present invention, when the fluorinated ester compound represented by the formula (1) is contained, the amount thereof is preferably 250 vol % or less, and more preferably 100 vol % or less, with respect to the volume of FMP, in view of providing the effects brought about by the fluorinated ester compound represented by the formula (1), specifically, the low viscosity and flame retardancy, as well as the improving effects on the flame retardancy and on the output characteristics of the nonaqueous electrolyte battery, which are brought about by FMP. The fluorinated ester compound represented by the formula (1) preferably has a viscosity of 1 mPa·s or less, and in view of making good use of its low viscosity, the viscosity of that fluorinated ester compound is more preferably 0.8 mPa·s or less. The viscosity as used herein means the viscosity at 25° C.

In the present invention, it is particularly preferable to use a combination of FMP, a fluorinated ester compound represented by the formula (1), and an ester compound represented by the formula (2) or (3), because a nonaqueous electrolyte battery that has both excellent output characteristics and high flame retardancy can be obtained. A combination of FMP, a fluorinated ester compound represented by the formula (1), and a fluorinated ester compound represented by the formula (2) or (3) is more preferable, and a combination of FMP, a fluorinated ester compound represented by the formula (1), and a fluorinated ester compound represented by the formula (2) is most preferable.

In view of improving the flame retardancy, it is also preferable that the electrolyte solution of the present invention contain a chain fluorinated ether represented by the formula (4). It is particularly preferable that the electrolyte solution contain FMP, a fluorinated chain ester represented by the formula (2) or (3), and a chain fluorinated ether represented by the formula (4). When the electrolyte solution of the present invention contains a chain fluorinated ether represented by the formula (4), the content thereof in the nonaqueous electrolyte solution is preferably from 0.1 mass % to 40 mass %, and more preferably from 5 mass % to 20 mass %, in terms of battery characteristics and flame retardancy. The amount of the chain fluorinated ether represented by the formula (4) is preferably from 0.1 vol % to 50 vol %, and more preferably from 6 vol % to 30 vol % with respect to the total solvent volume in the nonaqueous electrolyte solution.

Electrolyte

Preferred examples of the lithium electrolyte include lithium tetrafluoroborate ($LiBF_4$), lithium hexafluorophosphate ($LiPF_6$), lithium bis(fluorosulfonyl)amide (LiFSA), and lithium bis(trifluorosulfonyl) amide (LiTSFA). For example, the electrolyte concentration in the solvents of the electrolyte solution is preferably from 0.5 mol/L to 3.0 mol/L, more preferably from 0.5 mol/L to 2.0 mol/L, even more preferably from 0.8 mol/L to 1.8 mol/L, and most preferably from 0.8 mol/L to 1.5 mol/L. Usually, a lithium salt as an electrolyte is used at a concentration of about 1 mol/L in a solvent; however, as the electrolyte concentration increases, the vapor pressure of an inflammable solvent decreases due to vapor pressure depression, and the flash point and the fire point also increase accordingly. For this reason, higher safety is obtained when the electrolyte concentration is 1.2 mol/L or greater.

Phosphazene Compound

The phosphazene compound is a compound that has a P=N bond. Preferably, the phosphazene compound used in the present invention is a cyclic phosphazene compound represented by the following general formula (I), which decomposes in a high temperature environment (for example, an abnormal battery condition) to exhibit a fire extinguishing effect.

[Chemical Formula 5]

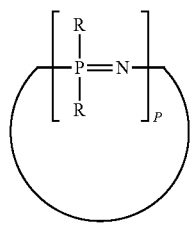

(I)

where R each independently represent a group selected from a halogen atom, an alkoxy group, an aryloxy group, an alkyl group, an aryl group, an amino group, an alkylthio group, and an arylthio group, and p represents 3 or 4.

Examples of the halogen atom represented by R in the general formula (I) include a fluorine atom and a chlorine atom.

Preferred examples of the alkoxy group represented by R include alkoxy groups having 1 to 12 carbon atoms, and in particular those having 1 to 6 carbon atoms. Specific examples thereof include a methoxy group and an ethoxy group.

Preferred examples of the aryloxy group represented by R include aryloxy groups having 6 to 14 carbon atoms, and in particular those having 6 to 10 carbon atoms. Specific examples thereof include a phenoxy group and a methylphenoxy group.

Preferred examples of the alkyl group represented by R include alkyl groups having 1 to 10 carbon atoms, and in particular those having 1 to 6 carbon atoms. Specific examples thereof include a methyl group and an ethyl group.

Preferred examples of the aryl group represented by R include aryl groups having 6 to 14 carbon atoms, and in particular those having 6 to 10 carbon atoms. Specific examples thereof include a phenyl group and a tolyl group.

The amino group represented by R includes substituted amino groups in which one or more hydrogen atoms in an amino group are replaced with an alkyl group or an aryl group, and may be a methylamino group or the like.

Preferred examples of the alkylthio group represented by R include alkylthio groups having 1 to 12 carbon atoms, and in particular those having 1 to 6 carbon atoms. Specific examples thereof include a methylthio group and an ethylthio group.

Preferred examples of the arylthio group represented by R include arylthio groups having 6 to 14 carbon atoms, and in particular those having 6 to 10 carbon atoms. Specific examples thereof include a phenylthio group.

Among the phosphazene compounds represented by the general formula (I), those in which at least one of the plurality of R is a fluorine atom are preferable, and those in which more preferably at least three, even more preferably at least four, and yet more preferably at least five of the plurality of R are fluorine atoms are favorable, in view of improving the flame retardancy of the nonaqueous electrolyte solution by combination use of the phosphazene with FMP.

The phosphazene compounds in which at least one of the plurality of R is an alkoxy group is preferable in view of improving the flame retardancy of the nonaqueous electrolyte solution by combination use of the phosphazene compound with FMP.

The content of the phosphazene compound in the nonaqueous electrolyte solution is preferably 0.1 mass % or greater in view of improving the flame retardancy of the nonaqueous electrolyte solution, and is more preferably 1 mass % or greater. Since an excessively large content of the phosphazene compound results in degradation of the battery characteristics, the content of phosphazene compound is preferably 20 mass % or less, more preferably 10 mass % or less, even more preferably 9 mass % or less, yet more preferably 7 mass % or less, and especially preferably 5 mass % or less.

Other Additives

The characteristics of the lithium ion secondary battery can be improved by adding other additives to the nonaqueous electrolyte solution, and therefore, numerous types of other additives have been proposed. Usually, the content of such additives is as small as 5% or less, for example, and the flash points of such additives are higher than those of fluorinated esters. Thus, such additives have no adverse effect on the flash point and the fire point.

Flame Retardancy

The flash point of the nonaqueous electrolyte solution of the present invention is preferably 40° C. or greater, and more preferably 60° C. or greater. The higher the flash point, the better. It is preferable that the nonaqueous electrolyte solution should not have a flash point. Any non-inflammable nonaqueous electrolyte solutions including a phosphazene compound have not been known hitherto.

The fire point of the nonaqueous electrolyte solution of the present invention is preferably 60° C. or greater, and more preferably 90° C. or greater. It is most preferable that the nonaqueous electrolyte solution should not have a fire point.

The flash point and the fire point as used herein are determined in accordance with "JIS 2265-4: 2007, Determination of flash point: Cleveland open cup method". According to this JIS standard, the flash point and the fire point are defined as follows.

"3.1 Flash Point

The lowest temperature of a sample is determined at which bringing an ignition source closer to the vapors of the sample under specified conditions causes the vapors of the sample to emit a flash and instantaneously ignite with propagation of a flame over the liquid surface of the sample. The found lowest temperature is barometrically corrected (a barometric pressure of 101.3 kPa), and the corrected value is taken as the flash point."

"3.2 Fire Point

The lowest temperature of a sample is determined at which bringing an ignition source closer to the vapors of the sample under specified conditions causes the vapors of the sample to emit a flash and instantaneously ignite and sustain burning for at least 5 seconds. The found lowest temperature is barometrically corrected (a barometric pressure of 101.3 kPa), and the corrected value is taken as the flash point."

Specific methods are as follows.

A sample cup is filled to a reference line with a sample, and the sample is heated at a rate of the temperature rise controlled within a range from 14 to 17° C. per minute. Then, when the temperature of the sample reaches a temperature that is lower by 56° C. than the expected flash point of the sample, heating is slowed down, and from a temperature that is lower by 23° C.±5° C. than the expected flash point, heating is controlled so that the rate of the temperature rise is 5 to 6° C. per minute. Each time the reading on a thermometer increases by 2° C., a test flame is applied so as to pass over the sample cup. The lowest temperature of the sample at which the test flame causes the vapors of the sample to ignite with propagation of the flame over the liquid surface of the sample is determined, and the found value is taken as the found flash point at room atmospheric pressure. Moreover, the test is continued as-is, and the lowest temperature of the sample at which the vapors of the sample are caused to ignite and sustain burning for at least 5 seconds is determined, and the found value is taken as the found fire point at room atmospheric pressure. These temperatures are each corrected to values at standard atmospheric pressure through a mathematical expression, and the corrected values are taken as the flash point and the fire point, respectively. The expected flash point is determined by the following a preliminary test: a sample is heated from room temperature at a rate of the temperature rise of 5 to 6° C. per minute, and each time the temperature increases by 2° C., whether the vapors of the sample were caused to ignite was determined. If no flash point was observed, the boiling point of the sample was used as the expected flash point.

Specific flash and fire points can be determined according to a method described in Examples described later. Herein, the upper-temperature limit in the determination of the fire point is the boiling point of an electrolyte solution to be determined, and if the electrolyte solution boils, it is determined that the electrolyte solution does not have a fire point. In Examples and Comparative Examples described later, the boiling points of electrolyte solutions to be determined were generally 100° C.

Conventional evaluations of the flame retardancy of flame-retardant electrolyte solutions are often made on the basis of the results of ignition tests in which a glass filter is impregnated with a nonaqueous electrolyte solution with reference to UL-94HB or UL-94V0. These test methods are those in which the non-flammability and the flame retardancy of a solid material, such as a resin, are evaluated by measuring the distance burnt. If a non-flammable glass filter is impregnated with a liquid in a test, it cannot be said that the results of the test indicate the intrinsic properties of the electrolyte solution itself, and also that the measurement of the distance burnt is likely to be imprecise. Moreover, the evaluation test is conducted at room temperature, and it is therefore unclear whether or not the same non-flammability and flame retardancy are exhibited in a high-temperature environment. There also are other methods for examination by actually assembling and charging a battery and conducting a nail penetration test, an overcharge test, a heating test, or the like. However, the results of these tests are affected by the types of the positive electrode, the negative electrode, the separator, and an exterior casing, and therefore cannot be said to indicate the safety of the electrolyte solution itself.

Therefore, the inventor of the present invention evaluates non-flammability of the nonaqueous electrolyte solution and judges the superiority/inferiority of flame retardancy thereof by the determination of the flash and fire points, which is performed in a test for evaluating a flammable liquid.

Lithium Ion Secondary Battery

Next, a nonaqueous electrolyte battery of the present invention will be described. The nonaqueous electrolyte battery of the present invention includes a positive electrode and a negative electrode and contains the nonaqueous electrolyte solution of the present invention as an electrolyte, and is preferably a lithium ion secondary battery.

[1] Negative Electrode

The negative electrode includes a negative-electrode current collector and a negative-electrode active material layer. The negative-electrode active material layer is formed of a so-called negative-electrode mixture containing a negative-electrode active material, and optionally contains a conductive agent, a binder, a thickener, a filler, and the like, as necessary. Examples of the negative-electrode active material include a carbonaceous material, a metal or semimetal, such as silicon (Si) and Sn, a metal oxide or semimetal oxide, such as a Si oxide and a Sn oxide, and a polyphosphate compound.

Graphite, amorphous carbon (graphitizable carbon or non-graphitizable carbon), diamond-like carbon, or a carbon nanotube, or a composite of these materials can be used as the carbonaceous material.

Al, Si, Pb, Sn, In, Bi, Ag, Ba, Ca, Hg, Pd, Pt, Te, Zn, or La, or an alloy of two or more of these metals can be used as the metal.

Polyvinylidene fluoride, a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide, polyamide-imide, or the like can be used as the binder for the negative electrode.

Aluminum, nickel, copper, silver, or an alloy of these metals can be used as the negative-electrode current collector in light of the electrochemical stability, and copper or a copper alloy is preferable. Examples of the shape of the negative-electrode current collector include a foil, flat plate-like shape, and a mesh-like shape. A copper foil is preferable as the base material for the negative electrode. Examples of the copper foil include a rolled copper foil and an electrolytic copper foil.

[2] Positive Electrode

The positive electrode includes a positive-electrode current collector and a positive-electrode active material layer. The positive-electrode active material layer is formed of a so-called positive-electrode mixture that contains a positive-electrode active material, and optionally contains a conductive aid, a binder, a thickener, a filler, and the like, as necessary.

Examples of the positive-electrode active material include composite oxides represented by $Li_xMO_y$, where M represents at least one transition metal (e.g., $Li_xCoO_2$, $Li_xNiO_2$, $Li_xMnO_3$, $Li_xNi_\alpha Co_{(1-\alpha)}O_2$, and $Li_xNi_\alpha Mn_\beta Co_{(1-\alpha-\beta)}O_2$, which have a layered $\alpha$-$NaFeO_2$ type crystal structure; and $Li_xMn_2O_4$ and $Li_xNi_\alpha Mn_{(2-\alpha)}O_4$, which have a spinel crystal structure); and polyanion compounds represented by $Li_wMe_x(XO_y)_z$, where Me represents at least one transition metal, and X represents, for example, P, Si, B, or V (e.g., $LiFePO_4$, $LiMnPO_4$, $LiNiPO_4$, $LiCoPO_4$, $Li_3V_2(PO_4)_3$, $Li_2MnSiO_4$, and $Li_2CoPO_4F$). The elements or polyanions in these compounds may be partially replaced by other elements or anion species, respectively.

The positive-electrode active materials may be used singly or in a combination of two or more.

The binders described as those for the negative electrode can be used as the binder for the positive electrode. Among others, polyvinylidene fluoride is preferable in light of the versatility and the low cost.

The current collectors described for the negative-electrode current collector can be used as the positive-electrode current collector.

A conductive aid may be incorporated into the positive-electrode active material layer containing the positive-electrode active material in order to reduce the impedance. Examples of the conductive aid include carbonaceous minute particles, such as graphite, carbon black, and acetylene black.

[4] Separator

Porous films and nonwoven fabrics made of polypropylene, polyethylene, polyimide, aramid, or the like can be used as the separator. A composite of these resins may also be used. A laminate of these resins can also be used as the separator. An inorganic layer may be disposed between the separator and an electrode.

[5] Exterior Casing

Any exterior casing that is stable against the electrolyte solution and has sufficient barrier properties to water vapor can be selected as appropriate. There is no limitation on the configuration of the nonaqueous electrolyte battery according to the present invention, and, for example, coin-shaped, cylindrical, rectangular, or aluminum laminate sheet-type nonaqueous batteries may be assembled.

EXAMPLES

Hereinafter, the present invention will be described in more detail by way of examples, but the present invention is not limited by the examples below. In tables, "M" for the amount of lithium electrolyte is an abbreviation for "mol/L".

Example 1

A nonaqueous electrolyte solution was prepared in the following manner. $LiPF_6$ was dissolved at a concentration of 1.0 mol/L in a mixed solvent of FEC and FMP in a volume ratio of 20:80. Then, HISHICOLIN E manufactured by Nippon Chemical Industrial Co., Ltd. (a compound represented by the general formula (I), where p is 3, and of the six R, five R are fluorine atoms and one R is an ethoxy group) was added thereto as a phosphazene compound so that the phosphazene compound content in the nonaqueous electrolyte solution was 2 mass %.

Example 2

A nonaqueous electrolyte solution was prepared in the same manner as that in Example 1, except that the $LiPF_6$ concentration was changed to 1.2 mol/L in the solvent.

Example 3

A nonaqueous electrolyte solution was prepared in the same manner as that in Example 2, except that a mixed solvent was prepared by mixing EC and FMP in a volume ratio of 20:80.

Example 4

A nonaqueous electrolyte solution was prepared in the same manner as that in Example 2, except that a mixed solvent was prepared by mixing FEC, FMP, and FEA in a volume ratio of 10:50:40.

Example 5

A nonaqueous electrolyte solution was prepared in a manner similar to that of Example 1, except that the content of HISHICOLIN E in the nonaqueous electrolyte solution was changed to 5 mass %.

Comparative Examples 1 to 3

Nonaqueous electrolyte solutions were prepared in the same manner as that in Example 1, except that a mixed solvent was prepared by mixing EC and EMC in a volume ratio of 30:70, and that the contents of HISHICOLIN E were as shown in Table 1.

Comparative Example 4

A nonaqueous electrolyte solution was prepared in the same manner as that in Example 1, except that HISHICOLIN E was not added.

Comparative Example 5

A nonaqueous electrolyte solution was prepared in the same manner as that in Example 1, except that a mixed solvent was prepared by mixing EC, DMC, and EMC in a volume ratio of 30:40:30 and that the content of HISHICOLIN E was as shown in Table 1.

Comparative Example 6

A nonaqueous electrolyte solution was prepared in the same manner as that in Example 4, except that HISHICOLIN E was not added.

The flame retardancy of the nonaqueous electrolyte solutions of Examples 1 to 5 and Comparative Examples 1 to 6 were evaluated according to the following method. Table 1 shows the results.

Flame Retardancy: Measurement of Flash Point and Fire Point

The flash point and the fire point of the nonaqueous electrolyte solutions obtained in Examples 1 to 5 and Comparative Examples 1 to 6 were determined in accordance with JIS 2265-4:2007 with the use of a Cleveland flash point tester CLA5 manufactured by Anton Paar or a Cleveland flash point tester ace-8 manufactured by Tanaka Scientific Limited. The flash point and the fire point are determined by a mechanism for an automatic detection of burning; however, in the case of an electrolyte solution containing a phosphazene compound, the flame is unlikely to propagate to directly above the container of the sample, and therefore, a detector of the tester may not react. In that case, the temperature at which ignition was visually observed was adopted, and the burning time was measured using a stopwatch. As described above, the upper-temperature limit in the determination of the fire point was the boiling point of an electrolyte solution to be determined, and if the electrolyte solution boiled, it was determined that the electrolyte solution does not have a fire point.

In the aforementioned two testers, the test flame passed over the sample cup within 1 second. As described above, the lowest temperature of the sample at which burning was sustained for at least 5 seconds was taken as the fire point.

TABLE 1

| | Composition of electrolyte solution (Ratio between amounts of solvents is by volume) | Phosphazene compound [mass %] | Flash point [° C.] | Fire point [° C.] |
|---|---|---|---|---|
| Ex. 1 | 1.0M LiPF$_6$ FEC/FMP = 20/80 | 2 | 61 | n.d. |
| Ex. 2 | 1.2M LiPF$_6$ FEC/FMP = 20/80 | 2 | 64 | n.d. |
| Ex. 3 | 1.2M LiPF$_6$ EC/FMP = 20/80 | 2 | 44 | n.d. |
| Ex. 4 | 1.2M LiPF$_6$ FEC/FMP/FEA = 10/50/40 | 2 | 44 | 96 |
| Ex. 5 | 1.0M LiPF$_6$ FEC/FMP = 20/80 | 5 | 63 | n.d. |
| Com. Ex. 1 | 1.0M LiPF$_6$ EC/EMC = 30/70 | no | 38 | 38 |
| Com. Ex. 2 | 1.0M LiPF$_6$ EC/EMC = 30/70 | 5 | 50 | 64 |
| Com. Ex. 3 | 1.0M LiPF$_6$ EC/EMC = 30/70 | 10 | 57 | 99 |
| Com. Ex. 4 | 1.0M LiPF$_6$ FEC/FMP = 20/80 | no | 50 | 60 |
| Com. Ex. 5 | 1.0M LiPF$_6$ EC/DMC/EMC = 30/40/30 | 5 | 42 | 72 |
| Com. Ex. 6 | 1.2M LiPF$_6$ FEC/FMP/FEA = 10/50/40 | no | 34 | 50 |

It can be seen that the common electrolyte solution of Comparative Example 1 burned for at least 5 seconds simultaneously with the ignition and therefore did not have self-extinguishing properties. On the other hand, in Examples 1 to 4, in which a phosphazene compound was added in an amount as small as 2 mass % to an electrolyte solution containing mainly FMP, there was a significant improvement to an extent such that the fire point was no longer observed. In particular, in Example 2, the fire was extinguished within 1 second all over the temperature range of the determination. Since the amount of phosphazene compound added was as small as 2 mass %, the adverse effects on the battery characteristics can be minimized.

On the other hand, as clear from Comparative Example 3, when the phosphazene compound was added even in an amount of 10 mass % to a common electrolyte solution, the fire point did not eliminated. Since the amount of the phosphazene compound added was 10 mass %, there is concern about the adverse effects on the battery characteristics. As in Comparative Example 4, if the phosphazene compound was not added, the fire point was 60° C., even when a fluorinated ester was contained as the main component. Therefore, it can be said that a synergetic effect of FMP and the phosphazene compound was exhibited to improve the self-distinguishing properties to an extent such that the fire point was no longer observed.

Comparative Example 7

A nonaqueous electrolyte solution was prepared in the same manner as that in Example 2, except that HISHICOLIN E was not added.

Example 6

A nonaqueous electrolyte solution was prepared in the same manner to that in Example 2, except that the content of HISHICOLIN E in the nonaqueous electrolyte solution was 5 mass %.

Example 7

A nonaqueous electrolyte solution was prepared in the same manner as that in Example 2, except that the content of HISHICOLIN E in the nonaqueous electrolyte solution was 10 mass %.

Example 8

A nonaqueous electrolyte solution was prepared in the same manner as that in Example 6, except that the LiPF$_6$ concentration was changed from 1.2 mol/L to 1.5 mol/L.

Example 9

A nonaqueous electrolyte solution was prepared in the same manner as that in Example 7, except that the LiPF$_6$ concentration was changed from 1.2 mol/L to 1.5 mol/L.

Example 10

A nonaqueous electrolyte solution was prepared in the same manner as that in Example 9, except that the LiPF$_6$ concentration was changed from 1.5 mol/L to 1.8 mol/L.

The flame retardancy of the obtained nonaqueous electrolyte solutions of Comparative Example 7 and Examples 6 to 10 was evaluated in the same manner as described above. Table 2 shows the results.

TABLE 2

| | Composition of electrolyte solution (Ratio between amounts of solvents is by volume) | Phosphazene compound [mass %] | Flash point [° C.] | Fire point [° C.] |
|---|---|---|---|---|
| Com. Ex. 7 | 1.2M LiPF$_6$ FEC/FMP = 20/80 | no | 44 | n.d. |
| Ex. 2 | 1.2M LiPF$_6$ FEC/FMP = 20/80 | 2 | 64 | n.d. |
| Ex. 6 | 1.2M LiPF$_6$ FEC/FMP = 20/80 | 5 | 72 | n.d. |
| Ex. 7 | 1.2M LiPF$_6$ FEC/FMP = 20/80 | 10 | 76 | n.d. |
| Ex. 8 | 1.5M LiPF$_6$ FEC/FMP = 20/80 | 5 | 82 | n.d. |
| Ex. 9 | 1.5M LiPF$_6$ FEC/FMP = 20/80 | 10 | 86 | n.d. |
| Ex. 10 | 1.8M LiPF$_6$ FEC/FMP = 20/80 | 10 | 70 | n.d. |

It can be seen from the results shown in Table 2 that when the content of phosphazene compound exceeds 5 mass %, the effect on raising the flash point decreases that is enhanced by an increase in the content of phosphazene compound.

Example 11

A nonaqueous electrolyte solution was prepared in the same manner as that in Example 8, except that the LiPF$_6$ concentration was changed from 1.5 mol/L to 1.6 mol/L, and that the ratio of the amount of FEC to the amount of FMP was changed to a volume ratio of 29:71.

Example 12

A nonaqueous electrolyte solution was prepared in the same manner as that in Example 10, except that the content of HISHICOLIN E in the nonaqueous electrolyte solution was changed to 5 mass %, and that the LiPF$_6$ concentration was changed to 2.7 mol/L in the solvent.

The flame retardancy of the nonaqueous electrolyte solutions of Examples 11 and 12 was evaluated in the same manner as described above. Table 3 shows the results.

TABLE 3

| | Composition of electrolyte solution (Ratio between amounts of solvents is by volume) | Phosphazene compound [mass %] | Flash point [° C.] | Fire point [° C.] |
|---|---|---|---|---|
| Ex. 11 | 1.6M LiPF$_6$ FEC/FMP = 29/71 | 5 | n.d. | n.d. |
| Ex. 12 | 2.7M LiPF$_6$ FEC/FMP = 20/80 | 5 | n.d. | n.d. |

As clear from Examples 11 and 12 shown in Table 3, non-flammability was improved to an extent such that the flash point and the combustibility were eliminated, by increasing the amount of the FEC relative to the amount of FMP or increasing the amount of LiPF$_6$.

Example 13

A nonaqueous electrolyte solution was prepared in the same manner as that in Example 8, except that the LiPF$_6$ concentration was changed from 1.5 mol/L to 1.8 mol/L and that 1,1,2,2-tetrafluoroethyl 2,2,2-trifluoroethyl ether (HFE347 pc-f) was added in an amount of 5 mass % (6 parts by volume per 100 parts by volume of the total volume of FEC and FMP) in a nonaqueous electrolyte solution to be obtained.

Example 14

A nonaqueous electrolyte solution was prepared in the same manner as that in Example 13, except that the amount of 1,1,2,2-tetrafluoroethyl 2,2,2-trifluoroethyl ether (HFE347 pc-f) added was changed to 10 mass % (13 parts by volume per 100 parts by volume of the total volume of FEC and FMP) in a nonaqueous electrolyte solution to be obtained.

Example 15

A nonaqueous electrolyte solution was prepared in the same manner as that in Example 14, except that the content of HISHICOLIN E in the nonaqueous electrolyte solution was changed to 2 mass %.

Example 16

A nonaqueous electrolyte solution was prepared in the same manner as that in Example 14, except that, instead of HFE347 pc-f, NOVEC 7100 manufactured by 3M was added in an amount of 10 mass % (12 parts by volume per 100 parts by volume of the total volume of FEC and FMP) in a nonaqueous electrolyte solution to be obtained. NOVEC 7100 is made of $C_4F_9OCH_3$.

Example 17

A nonaqueous electrolyte solution was prepared in the same manner as that in Example 14, except that, instead of HFE347 pc-f, NOVEC 7200 manufactured by 3M was added in an amount of 10 mass % (13 parts by volume per 100 parts by volume of the total volume of FEC and FMP) in a nonaqueous electrolyte solution to be obtained. NOVEC 7200 is made of $C_4F_9OC_2H_5$.

Example 18

A nonaqueous electrolyte solution was prepared in the same manner as that in Example 14, except that, instead of HFE347 pc-f, NOVEC 7300 manufactured by 3M was added in an amount of 10 mass % (11 parts by volume per 100 parts by volume of the total volume of FEC and FMP) in a nonaqueous electrolyte solution to be obtained. NOVEC 7300 is made of $C_2F_5CF(OCH_3)C_3F_7$.

Example 19

A nonaqueous electrolyte solution was prepared in the same manner as that in Example 14, except that HFE347 pc-f was not added, and that $C_3F_7COOCH_3$ (methyl heptafluorobutyrate) was added in an amount of 10 mass % (13 parts by volume per 100 parts by volume of the total of FEC and FMP) in a nonaqueous electrolyte solution to be obtained.

The flame retardancy of the electrolyte solutions of Examples 13 to 19 was evaluated in the same manner as described above. Table 4 shows the results.

TABLE 4

| | Composition of electrolyte solution (Ratio between amounts of solvents is by volume) | Phosphazene compound [mass %] | Other non-flammable component [mass %] | Flash point [° C.] | Fire point [° C.] |
|---|---|---|---|---|---|
| Ex. 13 | 1.8M LiPF$_6$ FEC/FMP = 20/80 | 5 | HFE347 pc-f 5 | 106 | n.d. |
| Ex. 14 | 1.8M LiPF$_6$ FEC/FMP = 20/80 | 5 | HFE347 pc-f 10 | n.d. | n.d. |
| Ex. 15 | 1.8M LiPF$_6$ FEC/FMP = 20/80 | 2 | HFE347 pc-f 10 | n.d. | n.d. |
| Ex. 16 | 1.8M LiPF$_6$ FEC/FMP = 20/80 | 5 | NOVEC 7100 10 | n.d. | n.d. |
| Ex. 17 | 1.8M LiPF$_6$ FEC/FMP = 20/80 | 5 | NOVEC 7200 10 | n.d. | n.d. |
| Ex. 18 | 1.8M LiPF$_6$ FEC/FMP = 20/80 | 5 | NOVEC 7300 10 | n.d. | n.d. |
| Ex. 19 | 1.8M LiPF$_6$ FEC/FMP = 20/80 | 5 | C$_3$F$_7$COOCH$_3$ | n.d. | n.d. |

As is the case with Examples 11 and 12, the electrolyte solutions were rendered non-flammable to an extent such that they did not have a flash point or a fire point as a result of adding the various non-flammable components in Examples 13 to 19 as well. It is considered that this is because the effect of phosphazene is relatively increased by reducing the vapor partial pressure of FMP.

Comparative Example 8

A nonaqueous electrolyte solution was prepared in the same manner as that in Comparative Example 1, except that LiPF$_6$ was not used, and that only FMP was used as a solvent.

Comparative Example 9

A nonaqueous electrolyte solution was prepared in the same manner as that in Comparative Example 1, except that LiPF$_6$ was not used, and that only EMC was used as a solvent.

For the electrolyte solutions obtained in Comparative Examples 1, 3, 4, 8, and 9 and Examples 8 and 14, the limiting oxygen concentration, which is a measure of resistance against burning, was determined. Here, a limiting oxygen index refers to the value of the minimum oxygen concentration required to sustain burning of a material under predetermined test conditions specified in JIS K 7201-2: 2007 and is in vol %, and a high limiting oxygen index means a low risk of firing or igniting. The determination was carried out with a testing equipment specified in K 7201-2: 2007 "Plastics—Determination of Burning Behaviour by Oxygen Index". Specifically, 3 mL of a sample was placed in a glass container with an inner diameter of 25 mm and a depth of 12 mm, and this glass container was mounted on a support made of stainless steel and having a shape suitable for setting in a cylinder for gas flow. The support together with the glass container was set in the glass cylinder. Oxygen and nitrogen were supplied into the glass cylinder, and the oxygen concentration was adjusted to a level that was enough to allow the sample to be ignited. The sample was ignited using a specified ignition device, and the sample was kept for 30 seconds. Then, the oxygen concentration was adjusted to a predetermined level. If the burning was sustained for at least 180 seconds after the adjustment of the oxygen concentration, it was determined that the sample is "flammable", and if the flame was extinguished in less than 180 seconds after the adjustment of the oxygen concentration, it was determined that the sample is "non-flammable". The minimum oxygen concentration at which burning was sustained for at least 180 seconds was taken as the "limiting oxygen concentration". The shape of the support conformed with the specification in "Notice No. 50 from the chief of the Hazardous Materials Management and Control Division of the Fire and Disaster Management Agency" issued by the Fire and Disaster Management Agency on May 31, 1995.

Table 5 shows the results.

TABLE 5

| | Composition of electrolyte solution (Ratio between amounts of solvents is by volume) | Phosphazene compound [mass %] | Other non-flammable component [mass %] | Limiting oxygen concentration [vol %] |
|---|---|---|---|---|
| Com. Ex. 8 | FMP = 100 | no | no | 19 |
| Com. Ex. 9 | EMC = 100 | no | no | 15 |
| Com. Ex. 1 | 1.0M LiPF$_6$ EC/EMC = 30/70 | no | no | 16 |
| Com. Ex. 3 | 1.0M LiPF$_6$ EC/EMC = 30/70 | 10 | no | 21 |
| Com. Ex. 4 | 1.0M LiPF$_6$ FEC/FMP = 20/80 | no | no | 22 |
| Ex. 8 | 1.5M LiPF$_6$ FEC/FMP = 20/80 | 5 | no | 26 |
| Ex. 14 | 1.8M LiPF$_6$ FEC/FMP = 20/80 | 5 | HFE347 pc-f 10 | 26 |

As shown above, it can be seen that the electrolyte solutions of Examples 8 and 14 had high limiting oxygen concentrations and were hence unlikely to burn and that they had therefore excellent safety.

Nonaqueous electrolyte batteries were produced using the electrolyte solutions of Examples 1, 4, 6, 8, and 14 as well as Comparative Examples 1, 3, 4, and 5, and the characteristics of the produced batteries were evaluated in accordance with the following method. Table 6 shows the results.

Battery Characteristics
Preparation of Secondary Battery
Preparation of Positive Electrode Lithium cobalt oxide (LiCoO$_2$) was used as a positive-electrode active material. 93 parts by mass of lithium cobalt oxide was mixed with 4 parts by mass of acetylene black and 3 parts by mass of polyvinylidene fluoride, and the mixture was slurried by adding N-methyl-2-pyrrolidone thereto. The resulting slurry was uniformly applied to one side of an aluminum foil having a thickness of 15 m in an amount of 12.7 mg/cm$^2$, dried, and then pressed so as to form a positive-electrode active material layer having a density of 2.8 g/cm$^3$, thereby obtaining a positive electrode.

Preparation of Negative Electrode

To 97 parts by mass of graphite (MAG-D from Hitachi Chemical Co., Ltd.) were added an aqueous dispersion of sodium carboxymethyl cellulose (the sodium carboxymethyl cellulose concentration was 1 mass %) serving as a thickener and an aqueous dispersion of a styrene-butadiene rubber (the styrene-butadiene rubber concentration was 50 mass %) serving as a binder. The mixture was slurried by mixing with a disperser. The obtained slurry was uniformly applied to one side of a copper foil having a thickness of 10 m in an amount of 7.5 mg/cm$^2$, dried, and then pressed so as to form a negative-electrode active material layer having a density of 1.36 g/cm$^3$, thereby obtaining a negative electrode. The slurry here was prepared such that, in the negative electrode after drying, the mass ratio of graphite:sodium carboxymethyl cellulose: styrene-butadiene rubber=97.3:1.5:1.2.

Production of Nonaqueous Electrolyte Secondary Battery

The coated sides of the above-described positive and negative electrodes were opposed to each other with a separator interposed therebetween. A polypropylene separator having a thickness of 20 m and a porosity of 54% was used as the separator. The battery element thus obtained was enclosed in an aluminum laminate film, and the above-described electrolyte solution was injected therein, followed by vacuum sealing. Thus, a nonaqueous electrolyte secondary battery having a sheet-like shape was produced. Furthermore, the sheet-like battery was held between aluminum plates and compressed in order to increase the adhesion between the electrodes.

Evaluation of Battery

Determination of Output Characteristics

In a constant temperature oven at 45° C., a nonaqueous electrolyte secondary battery having a sheet-like shape was charged at 1C for 20 minutes and then kept idle for 15 hours. After that, constant current-constant voltage charging at 0.2C was performed up to 4.2 V, and subsequently, constant current discharging at 0.2C was performed down to 2.75 V. Then, constant current-constant voltage charging up to 4.2 V and subsequent constant current discharging down to 2.75 V were repeated at 0.2C, 1C, and 0.2C in sequence to perform initial conditioning. Subsequently, constant current-constant voltage charging at 0.2C up to 4.2 V and subsequent constant current discharging at 0.2C down to 2.75 V were performed, and the discharge capacity at that time was taken as the reference of output characteristics. Next, constant current-constant voltage charging at 0.2C up to 4.2 V and subsequent constant current discharging down to 2.75 V were repeated while changing the discharge current to 0.5C, 1C, 2C, 3C, 5C, 7C, and 10C in sequence. Thus, the ratios of the discharge capacities at 5C, 7C, and 10C to the discharge capacity at 0.2C were obtained. 1C means a current value in the case where the entire battery capacity is discharged in 1 hour.

As shown in Table 6, the batteries of Examples exhibited higher output characteristics than those of Comparative Examples 1 and 3, in which common solvents were used. Moreover, a comparison between Comparative Example 4 and Example 1 also shows that, when FMP is used, degradation of the output characteristics due to adding a phosphazene compound is unlikely to be caused, and that both the excellent output and the excellent safety can be exhibited.

In particular, when Examples 4 and 6, in which the amounts of lithium electrolyte were at the same level, are compared with each other, Example 4 exhibited the higher efficiency discharge capacity at 10° C. relative to the capacity at 0.2C, and it can be said therefrom that the electrolyte solution of Example 4 had excellent safety while maintaining the output characteristics.

Furthermore, the battery of Example 14 had a high discharge capacity, and therefore it can be said that, when FMP is used, an electrolyte solution having excellent output characteristics can be obtained also by adding a fluorinated ether solvent.

INDUSTRIAL APPLICABILITY

The present invention provides a flame-retardant electrolyte solution that has high output characteristics and that also does not have a fire point until a high temperature is reached. Moreover, the present invention provides a battery with a reduced risk of a fire accident; specifically, a danger of firing the battery is effectively prevented even when the temperature thereof rises, and the battery is unlikely to be ignited even when liquid leak occurs due to a mechanical damage to the battery.

The invention claimed is:

1. A nonaqueous electrolyte solution comprising:
a lithium electrolyte;
methyl 3,3,3-trifluoropropionate; and
a phosphazene compound,
wherein the phosphazene compound is a cyclic phosphazene compound represented by the general formula (I):

TABLE 6

| | Composition of electrolyte solution (Ratio between amounts of solvents is by volume) | Phosphazene compound [mass %] | Other non-flammable component [mass %] | Discharge capacity ratio | | |
|---|---|---|---|---|---|---|
| | | | | 5 C/0.2 C [%] | 7 C/0.2 C [%] | 10 C/0.2 C [%] |
| Ex. 1 | 1.0M LiPF$_6$ FEC/FMP = 20/80 | 2 | no | 85.9 | 70.5 | 31.0 |
| Ex. 4 | 1.2M LiPF$_6$ FEC/FMP/FEA = 10/50/40 | 2 | no | 89.6 | 76.6 | 53.7 |
| Ex. 6 | 1.2M LiPF$_6$ FEC/FMP = 20/80 | 5 | no | 89.3 | 75.6 | 40.9 |
| Ex. 8 | 1.5M LiPF$_6$ FEC/FMP = 20/80 | 5 | no | 91.4 | 79.5 | 51.2 |
| Ex. 14 | 1.8M LiPF$_6$ FEC/FMP = 20/80 | 5 | HFE347 pc-f 10 | 92.1 | 80.2 | 54.6 |
| Com. Ex. 1 | 1.0M LiPF$_6$ EC/EMC = 30/70 | no | no | 75.4 | 53.0 | 25.4 |
| Com. Ex. 3 | 1.0M LiPF$_6$ EC/EMC = 30/70 | 10 | no | 71.7 | 48.9 | 24.1 |
| Com. Ex. 4 | 1.0M LiPF$_6$ FEC/FMP = 20/80 | no | no | 83.3 | 62.8 | 25.5 |
| Com Ex. 5 | 1.0M LiPF$_6$ EC/DMC/EMC = 30/40/30 | 5 | no | 82.7 | — | — |

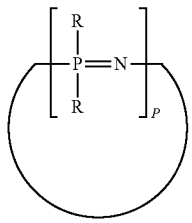 (I)

where R each independently represent a group selected from a halogen atom, an alkoxy group, an alkyl group, an aryl group, an amino group, an alkylthio group, and an arylthio group, and p represents 3 or 4, wherein methyl 3,3,3-trifluoropropionate is contained in an amount of 30 vol % or greater with respect to a total solvent volume in the nonaqueous electrolyte solution.

2. The nonaqueous electrolyte solution as set forth in claim 1, further comprising a fluorinated ester compound other than methyl 3,3,3-trifluoropropionate.

3. The nonaqueous electrolyte solution as set forth in claim 2,
wherein the fluorinated ester compound other than methyl 3,3,3-trifluoropropionate is fluoroethylene carbonate or 2,2,2-trifluoroethyl acetate.

4. The nonaqueous electrolyte solution as set forth in claim 1,
wherein the phosphazene compound is contained in an amount of 0.1 mass % to 20 mass %.

5. The nonaqueous electrolyte solution as set forth in claim 1,
wherein the phosphazene compound is contained in an amount of 0.1 mass % to 9 mass %.

6. The nonaqueous electrolyte solution as set forth in claim 1, further comprising a fluorinated chain ether represented by the general formula (4):

$$C_iH2_{i+1-b}F_b\text{—}O\text{—}C_jH_{2j+1-k}F_k \qquad (4)$$

where i is an integer of 1 to 8, j is an integer of 1 to 8, b is an integer of 0 to 2i+1, k is an integer of 0 to 2j+1, and at least one of b and k is an integer of 1 or more.

7. The nonaqueous electrolyte solution as set forth in claim 2,
wherein the fluorinated ester compound other than methyl 3,3,3-trifluoropropionate is contained in an amount from 5 vol % to 70 vol % with respect to the total solvent volume in the nonaqueous electrolyte solution.

8. A nonaqueous electrolyte battery comprising:
a positive electrode;
a negative electrode; and
the nonaqueous electrolyte solution as set forth in claim 1.

9. The nonaqueous electrolyte solution as set forth in claim 1,
wherein R in the general formula (I) each independently represent a group selected from a halogen atom, an alkoxy group, an alkyl group, an amino group, and an alkylthio group.

10. The nonaqueous electrolyte solution as set forth in claim 1,
wherein at least one of R in the general formula (I) is an alkoxy group.

11. The nonaqueous electrolyte solution as set forth in claim 2,
wherein the phosphazene compound is contained in an amount of 0.1 mass % to 20 mass %.

12. The nonaqueous electrolyte solution as set forth in claim 3,
wherein the phosphazene compound is contained in an amount of 0.1 mass % to 20 mass %.

13. The nonaqueous electrolyte solution as set forth in claim 2,
wherein the phosphazene compound is contained in an amount of 0.1 mass % to 9 mass %.

14. The nonaqueous electrolyte solution as set forth in claim 3,
wherein the phosphazene compound is contained in an amount of 0.1 mass % to 9 mass %.

15. The nonaqueous electrolyte solution as set forth in claim 2, further comprising a fluorinated chain ether represented by the general formula (4):

$$C_iH2_{i+1-b}F_b\text{—}O\text{—}C_jH_{2j+1-k}F_k \qquad (4)$$

where i is an integer of 1 to 8, j is an integer of 1 to 8, b is an integer of 0 to 2i+1, k is an integer of 0 to 2j+1, and at least one of b and k is an integer of 1 or more.

16. The nonaqueous electrolyte solution as set forth in claim 3, further comprising a fluorinated chain ether represented by the general formula (4):

$$C_iH2_{i+1-b}F_b\text{—}O\text{—}C_jH_{2j+1-k}F_k \qquad (4)$$

where i is an integer of 1 to 8, j is an integer of 1 to 8, b is an integer of 0 to 2i+1, k is an integer of 0 to 2j+1, and at least one of b and k is an integer of 1 or more.

17. The nonaqueous electrolyte solution as set forth in claim 4, further comprising a fluorinated chain ether represented by the general formula (4):

$$C_iH2_{i+1-b}F_b\text{—}O\text{—}C_jH_{2j+1-k}F_k \qquad (4)$$

where i is an integer of 1 to 8, j is an integer of 1 to 8, b is an integer of 0 to 2i+1, k is an integer of 0 to 2j+1, and at least one of b and k is an integer of 1 or more.

18. The nonaqueous electrolyte solution as set forth in claim 5, further comprising a fluorinated chain ether represented by the general formula (4):

$$C_iH2_{i+1-b}F_b\text{—}O\text{—}C_jH_{2j+1-k}F_k \qquad (4)$$

where i is an integer of 1 to 8, j is an integer of 1 to 8, b is an integer of 0 to 2i+1, k is an integer of 0 to 2j+1, and at least one of b and k is an integer of 1 or more.

19. The nonaqueous electrolyte solution according to claim 1, wherein each R substituent in the general formula (I) comprises 5 or more of fluorine atoms.

20. The nonaqueous electrolyte solution according to claim 1, wherein R in the general formula (I) each independently represents a halogen atom or an alkoxy group.

* * * * *